US008850475B2

(12) United States Patent
Sharma et al.

(10) Patent No.: US 8,850,475 B2
(45) Date of Patent: Sep. 30, 2014

(54) PROVISIONING AN ENHANCED TELEVISION (ETV) APPLICATION

(75) Inventors: Sudhanshu Sharma, Coppell, TX (US); Neena Pandey, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 553 days.

(21) Appl. No.: 12/897,891

(22) Filed: Oct. 5, 2010

(65) Prior Publication Data
US 2012/0084825 A1 Apr. 5, 2012

(51) Int. Cl.
*H04N 5/445* (2011.01)
*H04N 7/16* (2011.01)
*H04N 7/173* (2011.01)
*H04N 21/81* (2011.01)
*H04N 21/6543* (2011.01)
*H04N 21/435* (2011.01)

(52) U.S. Cl.
CPC ....... *H04N 21/8166* (2013.01); *H04N 21/6543* (2013.01); *H04N 21/4351* (2013.01)
USPC ............ 725/37; 725/49; 725/60; 725/61; 725/100; 725/131; 725/136; 725/139; 725/151

(58) Field of Classification Search
CPC . H04N 21/431; H04N 21/4312; H04N 21/47; H04N 21/4782; H04N 21/85; H04N 21/854
USPC .......... 725/37, 49, 60, 61, 100, 131, 136, 151
See application file for complete search history.

(56) References Cited

U.S. PATENT DOCUMENTS

| 2002/0184632 | A1* | 12/2002 | Reitmeier | 725/47 |
| 2003/0133043 | A1* | 7/2003 | Carr | 348/563 |
| 2006/0130120 | A1* | 6/2006 | Brandyberry et al. | 725/136 |
| 2006/0168624 | A1* | 7/2006 | Carney et al. | 725/51 |
| 2007/0091919 | A1* | 4/2007 | Sandoval | 370/466 |
| 2010/0043017 | A1* | 2/2010 | Paul et al. | 719/328 |
| 2010/0075591 | A1* | 3/2010 | Eyer et al. | 455/3.01 |
| 2010/0125869 | A1* | 5/2010 | Beyabani | 725/32 |
| 2011/0023015 | A1* | 1/2011 | Swires | 717/115 |

OTHER PUBLICATIONS

ATVEF.pdf, Enhanced Content Specification, ATVEF, Copyright 2000, http://www.atvef.com/library/spec1_1a.html.*

(Continued)

*Primary Examiner* — Nasser Goodarzi
*Assistant Examiner* — Kyu Chae

(57) ABSTRACT

A method includes detecting, from an Enhanced Television (ETV) Integrated Signaling Stream (EISS), an indication that an ETV application is available to be downloaded; downloading, in response to the indication, the ETV application from a video stream identified by the indication, where the ETV application does not conform to an ETV Binary Interchange Format (EBIF) standard; detecting, from the EISS, another indication that the ETV application is to be started; executing, in response to the other indication, the ETV application to generate an ETV page, where the ETV page includes information that is not permitted by the EBIF standard; and displaying the ETV page on a video display device to enables a user to interact with the ETV page.

25 Claims, 5 Drawing Sheets

(56) References Cited

OTHER PUBLICATIONS

Advanced Television Systems Committee, "ATSC Standard: Software Download Data Service", Nov. 16, 2004, 14 pages.

CableLabs®, "OpenCable™ Specifications—Enhanced TV Binary Interchange Format 1.0", OC-SP-ETV-BIF1.0-I03-060714, Jul. 14, 2006, 380 pages.

CableLabs®, "OpenCable™ Specifications ETV—Enhanced TV Binary Interchange Format 1.0", OC-SP-ETV-BIF1.0-I04-070921, Sep. 21, 2007, 420 pages.

Cable Television Laboratories, Inc., "OpenCable™ Specifications ETV—Enhanced TV Application Messaging Protocol 1.0", OC-SP-ETV-AM1.0-I04-070921, Sep. 21, 2007, 29 pages.

\* cited by examiner

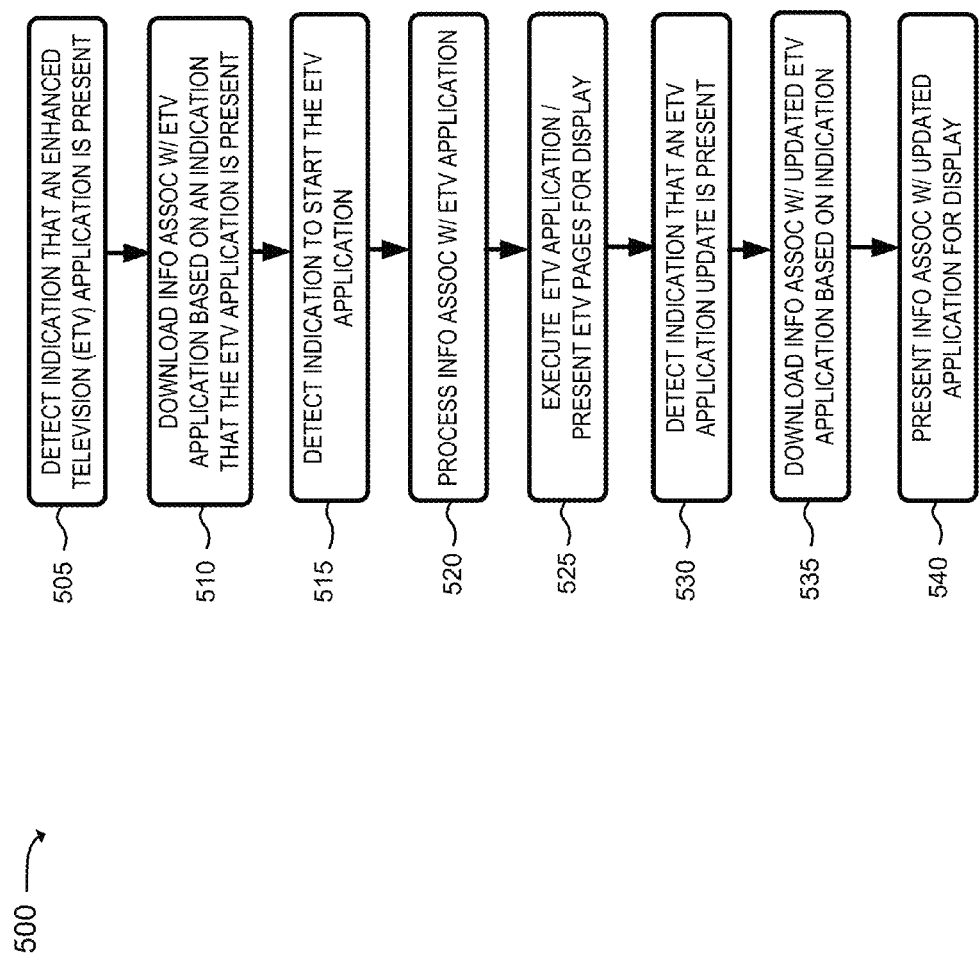

PROVISIONING AN ENHANCED TELEVISION (ETV) APPLICATION

BACKGROUND

Service providers are delivering an increasing amount and variety of television content, over broadband networks, to an ever-growing number of users. Broadband networks are expanding infrastructures to meet the growing demand to deliver and manage a growing array of television content, such as new television channels, television programs, Video on Demand (VoD) titles, and/or interactive television services intended to enhance the television viewing experience. Service providers are deploying interactive television services by embedding enhancements, such as interactive user applications (e.g., Enhanced Television (ETV) applications), into broadcast video streams.

Service providers often use a particular set of protocols and/or standards to deliver interactive user applications to users. Interactive user applications are often developed using special tools that generate interactive user applications that are compatible with the particular set of protocols and/or standards. These interactive user applications enable users to interact with television content by permitting the users to purchase goods and/or services, respond to advertisements or promotions, participate in voting, etc. Unfortunately, because most of the interactive user applications are based on the particular set of standards and/or protocols, interactive user applications have been slow to evolve and/or have limited functionality compared to applications in other media, such as web-based applications.

BRIEF DESCRIPTION OF THE DRAWINGS

FIG. 5 is a flow chart of an example process for provisioning an EBIF and/or a non-EBIF ETV application using an ETV application messaging protocol, according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may include systems and/or methods that enable an Enhanced Television (ETV) application, which has been generated in a manner that is not based on an ETV Binary Interchange Format (EBIF) standard, to be provisioned to a video client device using a conventional messaging protocol. Generating an ETV application that does not conform to the EBIF standard (hereinafter referred to as a "non-EBIF ETV application") may permit a variety of application types, page formats, data structures, data and/or application sources, programming techniques, and/or file types (e.g., text, video, audio, images, etc.) to be used to generate an ETV application and/or to display interactive ETV pages that may not conform to the EBIF standard. The interactive ETV pages may permit a user to interact with the ETV pages in a manner similar to the way users interact with web pages. Additionally, the ETV pages may be tailored to provide customized and/or personalized content and/or format based on preferences or habits of a user of a video client device.

In an example implementation, a non-EBIF ETV application may be sent to a video client device using a conventional messaging protocol (e.g., an ETV Application Messaging Protocol) that permits the use of existing network hardware and/or user equipment. A synchronizing application may enable a video client device, on which the synchronizing application is hosted, to download, process, and/or execute the non-EBIF ETV application. The synchronizing application may present interactive ETV pages and/or information (e.g., generated by the non-EBIF ETV application) for display on a video display device.

The term "ETV application," as used herein, may include information that is embedded in a video stream associated with television content that is destined for a video client device. The information, associated with the ETV application, may be embedded in the video stream as modules and/or blocks that are downloaded by the video client device. The downloaded modules and/or blocks may be processed and/or presented, for display on a video display device, as "pages" with which a user may interact. Additionally, or alternatively, the ETV application may include information that is downloaded from an application server (e.g., based on an Internet Protocol (IP), an IP multicast protocol, etc.), which may be processed and/or presented, for display, as pages with which the user may interact.

Figure 1:
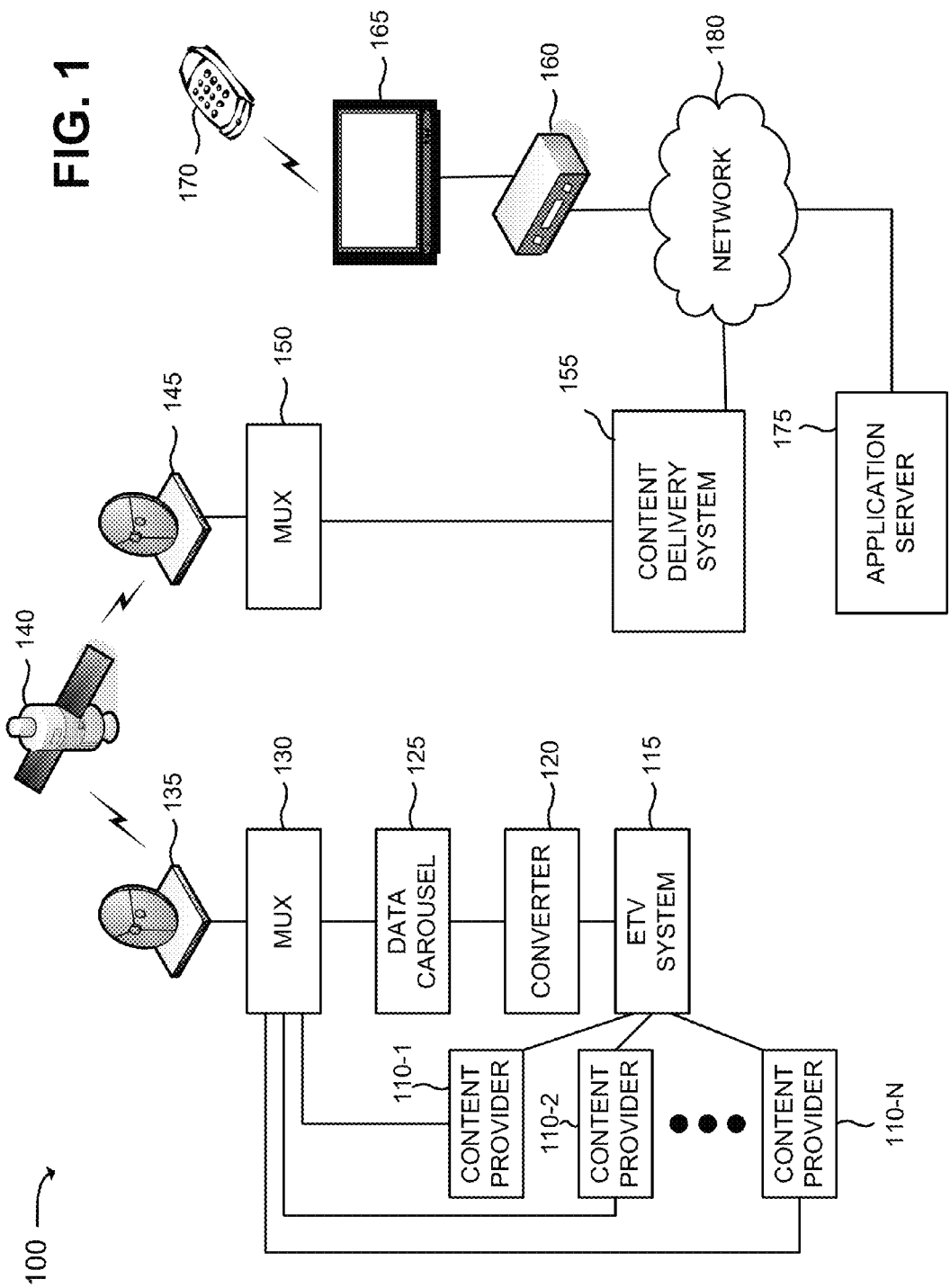
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of content providers 110-1, 110-2, ..., 110-N (where N≥1) (collectively referred to as "content providers 110" and individually as a "content provider 110"), an Enhanced Television (ETV) system 115, a converter 120, a data carousel 125, a multiplexer (MUX) 130, a satellite uplink 135, a satellite 140, a satellite downlink 145, a MUX 150, a content delivery system 155, a video client 160, a video display device 165, a remote control 170, an application server 175, and a network 180. In practice, environment 100 may include additional devices and/or networks, fewer devices and/or networks, different devices and/or networks, or differently arranged devices and/or networks than are shown in FIG. 1. For example, environment 100 may include a transmission medium that includes devices other than satellites and satellite uplinks and downlinks.

Also, two or more of these devices may be implemented within a single device, or a single device may be implemented as multiple, distributed devices. Further, while FIG. 1 shows direct connections between devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content providers 110 may include any type or form of content providers. For example, content providers 110 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., streaming content from web sites). Content providers 110 may produce media streams (e.g., television broadcasts). A "media stream," as used herein, may refer to stream of content that includes video content, audio content, and/or textual content.

ETV system 115 may include one or more devices that may work with content providers 110 to generate interactive content for the media streams. ETV system 115 may acquire, decode, and present information, and may execute actions contained in an EBIF signal and/or non-EBIF signal in order to present an interactive multimedia page for display to a user. For example, ETV system 115 may generate interactive content and associated signaling information (e.g., triggers) that are associated with the media streams.

Converter 120 may include a device that processes the interactive content and associated signaling information to conform to the EBIF standard. Converter 120 may output EBIF-compliant content and signaling information. In another example implementation, converter 120 may include a device that processes interactive content and associated signaling a different way. For example, converter 120 may process interactive content that is not based on the EBIF standard. The interactive content (e.g., a non-EBIF ETV application) may be based on a script language, instead of the EBIF standard, that is compatible with the ETV application messaging protocol. Alternatively, or additionally, converter 120 may output the non-EBIF content and signaling information based on the ETV application messaging protocol.

Data carousel 125 may include one or more devices that process the EBIF-compliant and non-EBIF content and signaling information to generate multiple data carousels on multiple separate data packet identifiers (PIDs) as part of a Moving Picture Experts Group (MPEG)-2 single program transport stream (SPTS). For example, a first PID may contain EBIF-compliant or non-EBIF content and a second PID may contain the signaling information.

MUX 130 may include one or more multiplexer devices that receive the media streams from content providers 110 and the EBIF-compliant and/or non-EBIF content and associated signaling information from data carousel 125 and multiplex or otherwise combine this data to create an enhanced media stream.

Satellite uplink 135 may include a satellite transmitter that receives the enhanced media stream, processes the enhanced media stream for transmission, and transmits the enhanced media stream to satellite 140. Satellite 140 may include a stationary or orbiting communication satellite that receives the enhanced media stream and relays the enhanced media stream to satellite downlink 145.

Satellite downlink 145 may include a satellite receiver that receives the enhanced media stream from satellite 140, processes the enhanced media stream for transmission, and transmits the enhanced media stream to MUX 150. MUX 150 may include one or more multiplexer devices that process the enhanced media stream for transmission to content delivery system 155.

Content delivery system 155 may include one or more devices that receive the enhanced media stream and demultiplex and/or process the enhanced media stream for transmission, according a particular protocol, such as the asynchronous serial interface (ASI) format, to user equipment (e.g., video client 160). Content delivery system 155 may include a service adaptor component and a media relay component. The service adaptor component may control what information (e.g., what video programs and/or advertisements) to provide to which users based, for example, on user subscriptions and/or profiles. The media relay component may control the transmission of the information to the users (e.g., to video client 160). The media relay component may perform multiplexing, demultiplexing, encoding, and/or encryption functions. The media relay component may include a multiplexer component that performs some form of modulation on the enhanced media stream, such as quadrature amplitude modulation (QAM). Content delivery system 155 may, for example, transmit broadcast media streams to video client 160. In another example, content delivery system 155 may transmit IP multicast information and/or data streams to video clients 160, which have subscribed to and/or are authorized to receive the multicast information and/or data streams.

Video client 160 may include a device that can receive and process the enhanced media stream and/or information (e.g., via other protocols, such as IP, IP multicast, etc.) from network 180. In one implementation, video client 160 may take the form of a set-top box (STB). In another implementation, video client 160 may include a computer device, a cable card, a communication device (e.g., a telephone, such as a voice over Internet protocol (VoIP) telephone or a mobile telephone, or a personal digital assistant (PDA)), or the like.

Video client 160 may perform synchronization and/or signaling functions to download, decode, execute, and/or update an ETV application. In one example, synchronization and/or signaling functions may be based on an ETV application messaging protocol. For example, the synchronization and/or signaling instructions may be included in an ETV integrated signaling stream (EISS) that enables an ETV application to be downloaded, started, updated, stopped, discarded, etc. according to a timeline and/or in a manner that is synchronized with a video stream that includes television content.

Video client 160 may perform decoding and/or decryption functions on the enhanced media stream received from content delivery system 155. Video client 160 may host a synchronization application to download modules and/or blocks associated with the enhanced media stream (e.g., an ETV application). In one example, the modules and/or blocks may be downloaded using a Software Download Data Service standard (e.g., Advanced Television Systems Committee standard A/97). In one example implementation, video client 160 may download an ETV application that is based on the EBIF standard. The ETV application may include an executable portion (e.g., a main application partition file associated with a ".pr" filename extension). The ETV application may include a data resources portion (e.g., a data resource file(s) associated with a ".dr" filename extension) that is associated with the executable portion.

In another example implementation, video client 160 may download an ETV application that is not based on the EBIF standard (e.g., a non-EBIF ETV application). For example, video client 160 may use a synchronization application to download the non-EBIF ETV application that is based on a script language. The script language may be, in one example, an extension language such as Lua (pronounced "loo-ah"), which is used in high-end applications (e.g., dynamic three-dimensional (3D) animation, gaming applications, etc.). The non-EBIF ETV application may include an executable portion based on the script language (e.g., a Lua file with a ".lua" filename extension) instead of the EBIF executable portion. The non-EBIF ETV application may include a variety of file types (e.g., text, tables, data, etc.), rather than the EBIF data resources portion.

Video client 160 may use the synchronization application to download a non-EBIF ETV application and/or data resources from application server 175 using IP-based protocols or some other protocol. For example, video client 160 may download a non-EBIF ETV application from application server 175 based on an IP protocol. In another example, video client 160 may download a non-EBIF ETV application from content delivery system 155 using an IP multicast protocol. Video client 160 may control and/or execute the downloaded non-EBIF ETV applications based on indicators detected on an EISS data stream received from content delivery system 155. Obtaining ETV applications (e.g., non-EBIF ETV application), using IP-based protocols, may introduce additional diversities that reduce bandwidth utilization associated with obtaining ETV applications and/or data resources exclusively or predominantly from the broadcast video stream.

Video client 160 may use the synchronization application to download a non-EBIF ETV application and/or data resources directly from content provider 110 (e.g., in addition to and/or instead of via content delivery system 155). For example, video client 160 may download a non-EBIF ETV application from content provider 110 based on an indicator detected in an EISS stream received from content delivery server 155. The indicator may include an identifier associated with another data stream associated with content provider 110 and/or an address associated with content provider 110 from which a non-EBIF ETV application may be downloaded (e.g., using an IP-based protocol, etc.).

Video display device 165 may include any device capable of receiving and/or reproducing video and/or audio signals. In one implementation, video display device 165 may take the form of a television. In another implementation, video display device 165 may include a computer monitor, a display of a communication device (e.g., a telephone, such as a VoIP telephone or a mobile telephone, or a PDA), or the like. Video display device 165 may be connected to video client 160 and may receive signals, from video client 160, containing television content for display.

Remote control 170 may include any device capable of remotely controlling the operation of video client 160 and/or video display device 165. Remote control 170 may take the form of a remote control device similar to a television or STB remote control device, a game controller, a keyboard, a keypad, a PDA, a mobile telephone, or the like. Remote control 170 may provide commands to video client 160 and/or video display device 165 by transmitting signals, such as wireless signals (e.g., infrared or Bluetooth) or signals transmitted over wires (e.g., over a universal serial bus (USB) interface or the like), to a reader associated with video client 160 and/or video display device 165.

Application server 175 may include one or more server devices, or other types of computation or communication devices, that gather, process, search, store, and/or provide information in a manner similar to that described herein. Application server 175 may interface with video client 160, content delivery system 155, etc. via network 180. Application server 175 may include a device that is capable providing interactive content to content delivery system 155 and/or video client 160. In one example, application server 175 may provide non-EBIF content to video client 160 that is out of band relative to the enhanced media stream being outputted by content delivery system 155. Application server 175 may send a non-EBIF ETV application, data resources, and/or updates to video client 160 based on an IP-based protocol. In another example, application server 175 may store customization information associated with preferences and/or user habits associated with a user of video client 160. Application server 160 may use the customization information to tailor information associated with the non-EBIF ETV application, the data resources and/or the updates that are sent to video client 160.

Network 180 may include a single network or multiple networks. For example, network 185 may include a video signaling and distribution network, such as a fiber optic-based network (e.g., a fiber optic service network), that distributes information and/or television content from content delivery system 155. Additionally, or alternatively, network 180 may include one or more wired and/or wireless networks. For example, network 180 may include a cellular network, the Public Land Mobile Network (PLMN), and/or a second generation (2G) network, a third generation (3G) network, a fourth generation (4G) network, a fifth generation (5G) network, and/or another network (e.g., a long term evolution (LTE) network). Additionally, or alternatively, network 180 may include a wide area network (WAN), a metropolitan area network (MAN), a telephone network (e.g., the Public Switched Telephone Network (PSTN)), an ad hoc network, an intranet, the Internet, and/or a combination of these or other types of networks.

Figure 2:
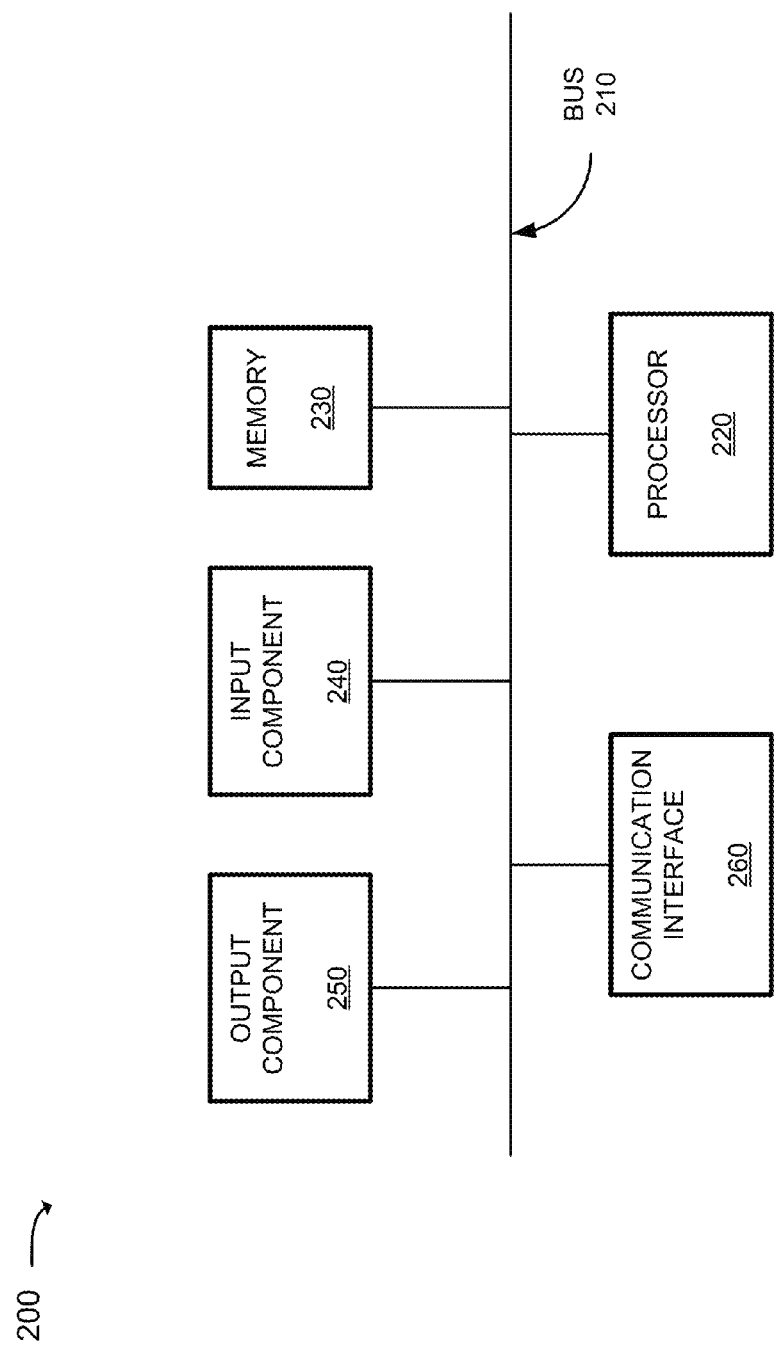
FIG. 2 is a diagram of example components of one or more of the devices depicted in FIG. 1.

FIG. 2 is a diagram of example components of a device 200 that may correspond to ETV system 115, content delivery system 155, video client 160, video display device 165, and/or application server 175. Device 200 may include a bus 210, a processor 220, a memory 230, an input component 240, an output component 250, and a communication interface 260. In another implementation, device 200 may include additional components, fewer components, different components, or differently arranged components than are shown in FIG. 2.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems. For example, communication interface 260 may include an Ethernet interface, an optical interface, a coaxial interface, or the like.

As will be described in detail below, device 200 may perform certain operations relating to provisioning a non-EBIF ETV application generated using a scripting language. Device 200 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device. The software instructions contained in memory 230 may cause to processor 220 to perform processes described herein. Alternatively, hardwired circuitry may be used in place of or in combination with software instructions to implement processes described herein. Thus, implementations described herein are not limited to any specific combination of hardware circuitry and software.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
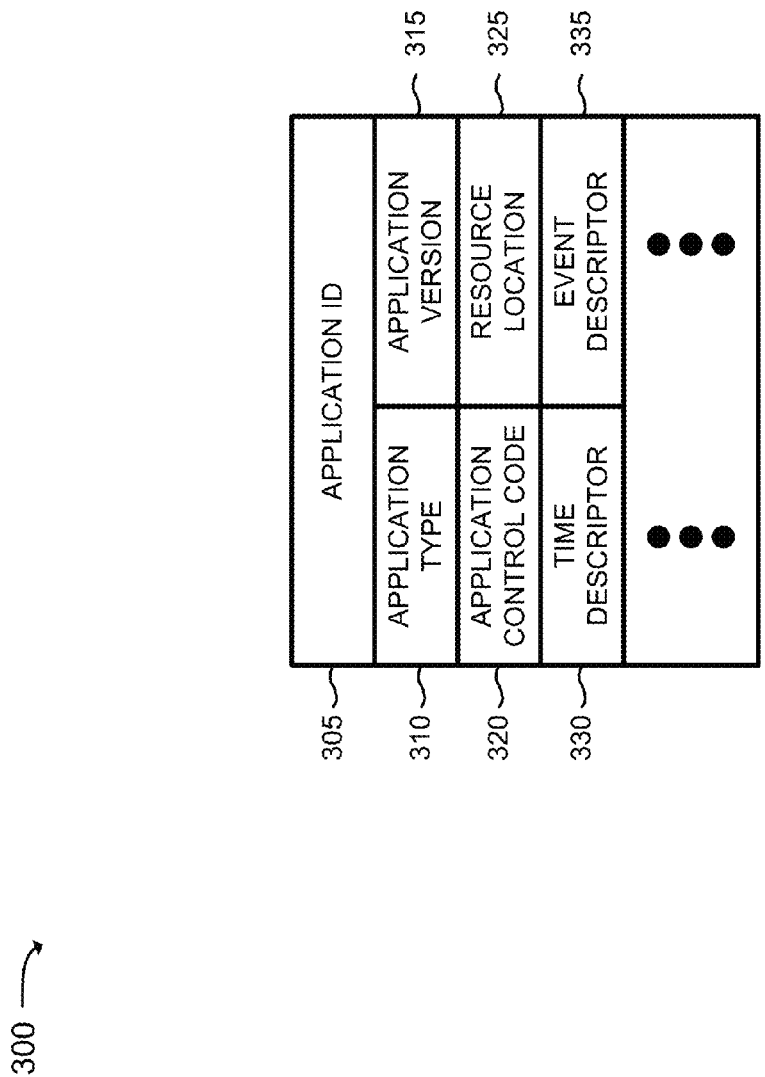
FIG. 3 is a diagram of an example Enhanced Television (ETV) application messaging protocol data structure used to provision a non-EBIF-based ETV application within the environment illustrated in FIG. 1.

FIG. 3 is a diagram of an example ETV Application Messaging Protocol data structure 300 (hereinafter referred to as AMP data structure 300) used to provision an ETV application within environment 100 of FIG. 1. AMP data structure 300 may be stored in packets (e.g., within a packet header, trailer, and/or payload) associated with an EISS data stream that provides synchronization and/or signaling instructions associated with an enhancement, such as an ETV application, embedded within a broadcast video stream containing television content and/or an ETV application that is downloaded from application server 175 and/or content provider 110. AMP data structure 300 may be used by video client 160 to identify, download, process, start, update, terminate, and/or perform other operations associated with the ETV application. As illustrated in FIG. 3, AMP data structure 300 may include a collection of fields, such as an application identifier (ID) field 305, an application type field 310, an application version field 315, an application control code field 320, a resource locator field 325, a time descriptor field 330, and an event descriptor field 335.

AMP data structure 300 includes fields 305-335 for explanatory purposes. In practice, AMP data structure 300 may include additional fields, fewer fields, different fields, and/or differently arranged fields than are described with respect to AMP data structure 300. For example, AMP data structure 300 may include other fields associated with an ETV application messaging protocol, such as an application priority field, an ETV messaging protocol version field, and/or other fields.

Application identifier (ID) field 305 may store an identifier associated with an ETV application (e.g., application ID) that is embedded as an enhancement to a broadcast video stream sent from a data carousel (e.g., data carousel 125) and/or a content provider (e.g., content provider 110), included in a media stream sent from a server device (e.g., application server 175), and/or downloaded from a server device and/or content provider. For example, a synchronization application, hosted by video client device 160, may use the application ID to detect, retrieve, and/or download the ETV application.

Application type field 310 may store an indicator associated with a type of protocol and/or standard on which the ETV application (e.g., the ETV application associated with the application ID) is based. For example, an indicator may correspond to an ETV application that is based on the EBIF standard (e.g., that includes components associated with .pr and/or .dr filename extensions and/or other filename extensions). In another example, another indicator may correspond to a non-EBIF ETV application, such as an ETV application that is based on a scripting language (e.g., that includes components associated with .lua and/or other filename extensions) and/or some other non-EBIF language, standard, and/or protocol.

Application version field 315 may store an indicator that identifies a version associated with the ETV application (e.g., the ETV application associated with the application ID). For example, an indicator may correspond to a particular version of the ETV application when the ETV application is downloaded by the synchronization application. In another example, a different indicator (e.g., a later and/or updated version) may be associated with ETV application data and/or software to be downloaded, at a later point in time, to update and/or replace the particular version of the ETV application.

Application control code field 320 may store an indicator associated with a synchronization and/or signaling mechanism, associated with the ETV application (e.g., the ETV application associated with the application ID). For example, video client 160 may monitor an EISS (e.g., received from content delivery system 155) and the synchronization application may detect an indicator (e.g., a control code, such as an "application present" string, etc.) that indicates that an ETV application (e.g., the ETV application associated with the application ID) is to be downloaded to video client 160. In another example, video client 160 may monitor the EISS and the synchronization application may detect another indicator (e.g., another control code, such as "start application," etc.) that indicates that the ETV application (e.g., previously downloaded to video client 160) is to be decoded and/or started by video client 160. In yet another example, video client 160 may monitor the EISS and the synchronization application may detect yet another indicator (e.g., a control code, such as "OnData," etc.) that indicates that ETV application data and/or software is available to be downloaded to update the ETV application that is being executed on video client 160. Other control codes may be detected and/or processed by the synchronization application, such as control codes associated with pausing an ETV application, terminating an ETV application, etc. Additionally, or alternatively, other control codes, which are not compliant with the EBIF standard, may be included in the EISS for a non-EBIF ETV application (e.g., such as control code to hide an ETV application, etc.). In one example, the control codes, associated with a non-EBIF ETV application that was downloaded from application server 175 (e.g., based on an IP-based protocol), may include signaling (e.g., such as time stamps, triggers, etc.) that permits video client 160 to synchronize and/or execute the downloaded application in a manner that coincides with television content being received via a broadcast video stream being received via content delivery system 155.

Resource locator field 325 may store location information associated with a source from which the ETV application (e.g., the ETV application associated with the application ID) and/or data resources may be obtained by video client 160. In one example, the location information may correspond to the broadcast video stream, being transmitted from data carousel 125 and/or content provider 110, within which the ETV application is being transmitted. In another example, if the ETV application is a non-EBIF ETV application, resource locator field 325 may store location information associated with a variety of other sources from which the ETV application may be obtained. In this example, resource locator field 325 may store an address associated with a server device (e.g., application server 175) and/or content provider (e.g., content provider 110) from which an ETV application and/or data resources may be downloaded. In other examples, resource locator field 325 may store information associated another media stream (e.g., an IP multicast stream, etc.), another server device, another content provider 110, and/or another data carousel 125 from which the ETV application is to be obtained.

Time descriptor field 330, may store timing information, associated with the television content that is being transmitted via broadcast video stream, that permits the ETV application to be synchronized with the television content.

Event descriptor field 335 may store a time at which the synchronization application is to perform an act in response to an application control code (e.g., "start application") stored in application control code field 320. For example, the synchronization application may cause a downloaded ETV application (e.g., the ETV application associated with the application ID) to execute when a particular time (e.g., stored in event descriptor field 335) matches a time stored in time descriptor field 330.

Figure 4:
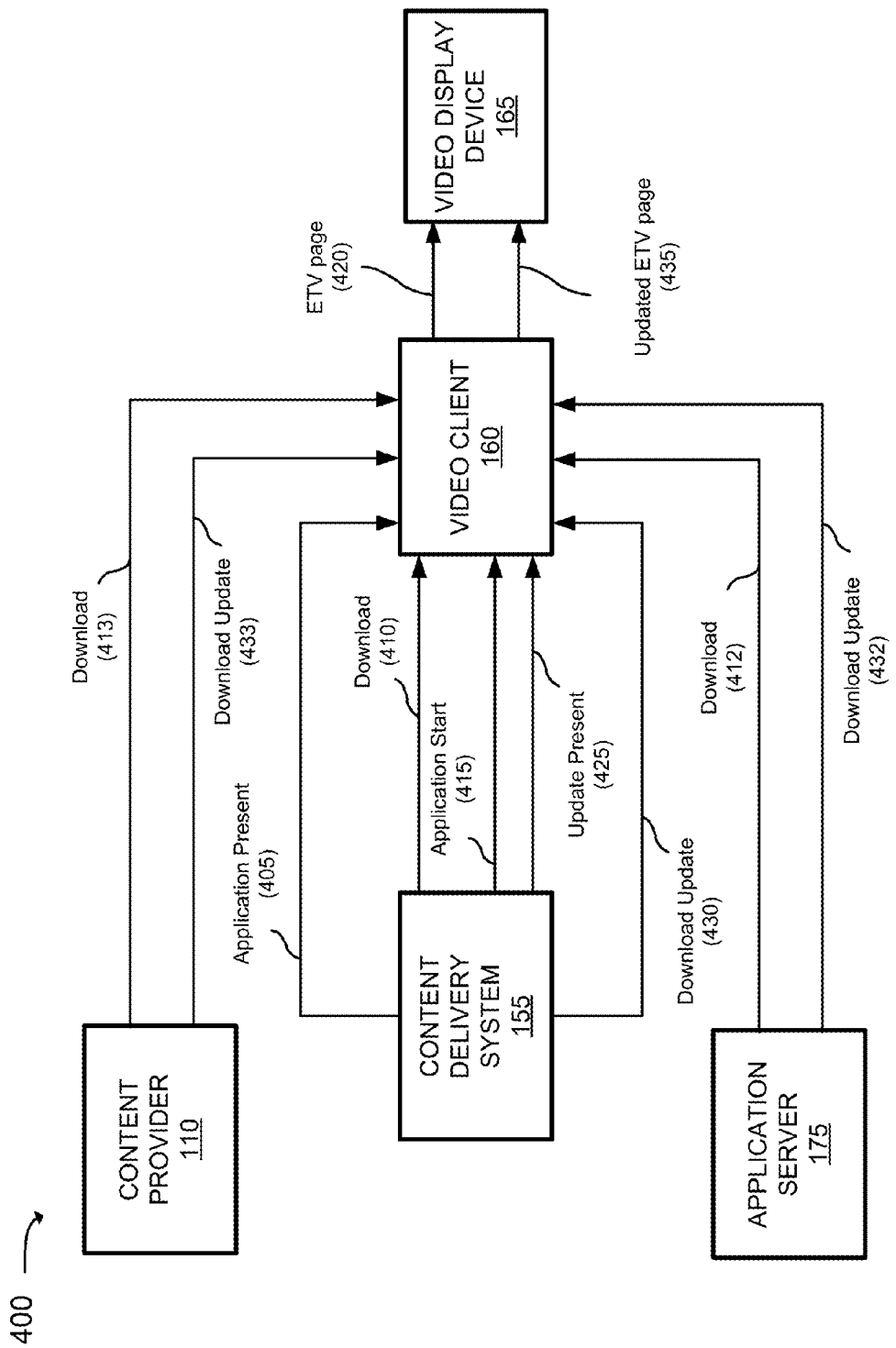
FIG. 4 is a diagram of an example interactions between devices of an example portion of the environment illustrated in FIG. 1.

FIG. 4 is a diagram of example interactions between devices of an example portion 400 of environment 100. As illustrated in FIG. 4, example environment portion 400 may include content provider 110, content delivery system 155, video client 160, video display device 165, and application server 175. Content provider 110, content delivery system 155, video client 160, video display device 165, and application server 175 may include the features described above in connection with one or more of FIGS. 1 and 2.

As shown in FIG. 4, content delivery system 155 may transmit an application present indicator 405 (e.g., embedded within an EISS) to video client 160, which indicates that an ETV application is available to be downloaded from a broadcast video stream. Video client 160 may, for example, detect that an ETV application is present 405 from content delivery system 155 and may determine whether the ETV application is an EBIF application or a non-EBIF application. If the ETV application is an EBIF application, video client 160 may download the EBIF application, as indicated by a download indicator 410, from a broadcast video stream being received from content delivery system 155.

If the ETV application is a non-EBIF application, video client 160 may monitor one or more broadcast video streams based on a resource locator (e.g., resource locator 325 of FIG. 3) obtained from application present indicator 405. Video client 160 may, for example, download the non-EBIF ETV application, as indicated by download indication 410, from a broadcast video stream, being received from content delivery system 155, when the resource locator corresponds to the broadcast video stream. In another example, video client 160 may download the non-EBIF ETV application, as indicated by a download indication 412, from another broadcast video stream, being received from application server 175, when the resource locator corresponds to the other broadcast video stream. In yet another example, video client 160 may download the non-compliant ETV application from application server 175 (e.g., indication 412) using an IP-based protocol based on an address (e.g., an IP address a universal resource locator (URL), etc.) included in the resource locator. In still another example, video client 160 may download the non-EBIF ETV application, as indicated by a download indication 413, from another broadcast video stream, being received from content provider 110, when the resource locator corresponds to the other broadcast video stream. In a further example, video client 160 may download the non-compliant ETV application from content provider 110 (e.g., indication 413) using an IP-based protocol (e.g., an IP multicast protocol) based on an address (e.g., an IP multicast address a universal resource locator (URL), etc.) included in the resource locator.

As yet further shown in FIG. 4, video client 160 may detect, from the EISS being received from content delivery system 155, an application start indication 415 associated with the downloaded ETV application (e.g., the EBIF or the non-EBIF ETV application). Video client 160 may, for example, execute the ETV application in order to generate one or more ETV pages and may send the one or more ETV pages, as indicated by ETV page indication 420, to video display device 165, for display. In another example implementation, video client 160 may automatically execute the downloaded ETV application without detecting application start indication 415.

As shown in FIG. 4, video client 160 may detect an update present indicator 425, from the EISS being received from content delivery system 155, indicating that an update to the ETV application is available to be downloaded. Video client 160 may, for example, determine whether the update is an EBIF update or a non-EBIF update. If the update is an EBIF update, video client 160 may download the EBIF update, as indicated by a download update indication 430, from the broadcast video stream being received from content delivery system 155.

If the update is a non-EBIF update, video client 160 may monitor the one or more broadcast video streams based on a resource locator (e.g., resource locator 325 of FIG. 3) obtained from update present indicator 425. Video client 160 may, for example, download the non-EBIF update, as indicated by download update indication 430, from the broadcast video stream, being received from content delivery system 155, when the resource locator corresponds to the broadcast video stream. In another example, video client 160 may download the non-EBIF update, as indicated by download update indication 432, from the other broadcast video stream being received from application server 175 and/or by retrieving the non-EBIF update from application server 175 (e.g., using an IP-based protocol or some other protocol) based on the resource locator. In still another example, video client 160 may download the non-EBIF update, as indicated by download update indication 433, from the other broadcast video stream being received from content provider 110 and/or from content provider 110 based on an IP multicast protocol based on the resource locator.

Other control signals, associated with the non-EBIF ETV application, data resources, and/or non-EBIF updates may be detected from the EISS data stream being received from content delivery system 155 than are shown in FIG. 4. For example, video client device 160 may detect control signals that are customized to preferences and/or user habits of a user of video client device 160. In another example, control signals that are unique to the non-EBIF ETV application may be detected which enables video client 160 to execute the non-EBIF ETV application in a manner that does not comply with the EBIF standard.

Video client 160 may execute the ETV application in order to update and/or replace the one or more ETV pages and may send one or more updated and/or replaced ETV pages, as indicated by update ETV page indicator 435, to video display device 165, for display. In another example implementation, video client 160 may perform the update in response to an indication that indicates that the update is to be started.

FIG. 5 is a flow chart of an example process 500 for provisioning an EBIF and/or a non-EBIF ETV application using an ETV application messaging protocol. In one implementation, process 500 may be performed by video client 160. In another implementation, some or all of process 500 may be performed by a device or collection of devices separate from, or in combination with, video client 160. A portion of process 500 will be discussed below with corresponding references to indicators identified with respect to example environment portion 400 of FIG. 4.

As shown in FIG. 5, process 500 may include detecting an indication that an ETV application is present (block 505). For example, a user, of video client 160, may be viewing television content (e.g., associated with a particular television channel), on video display device 165, that is being received via a broadcast video stream from content delivery system 155. Video client 165 may monitor an EISS associated with the broadcast video stream and may detect, as application present indication 405 (FIG. 4), that an ETV application is available to be downloaded. Video client 160 may detect that the ETV application is available to be downloaded based on an AMP data structure (e.g., AMP data structure 300 of FIG. 3) stored in packets associated with the EISS. More particularly, a synchronization application, hosted by video client 160, may determine that an application control code stored within the AMP data structure (e.g., application control code 320 of FIG. 3), corresponds to an indication that an ETV application is present.

The synchronization application may determine whether the ETV application is an ETV application based on the EBIF standard (e.g., an EBIF ETV application) or an ETV application that is not based on the EBIF standard and/or does not conform to the EBIF standard (e.g., a non-EBIF ETV application). For example, the synchronization application may determine that the ETV application is an EBIF ETV application when an indicator, stored in the AMP data structure (e.g., application type field 310 of FIG. 3), corresponds to an EBIF ETV application. In another example, the synchronization application may determine that the ETV application is a non-EBIF application when the application indicator corresponds to a non-EBIF ETV application, such as an application based on a scripting language (e.g., Lua and/or some other scripting language).

As also shown in FIG. 5, process 500 may include downloading information associated with an ETV application based on an indication that the ETV application is present (block 510). For example, based on the determination that ETV application is an EBIF ETV application, video client 160 may monitor the broadcast video stream being received from content delivery system 155 to identify the EBIF ETV application based on an application ID stored in AMP data structure (e.g., in application ID field 305). Video client 160 may download, as download indication 410 (FIG. 4), modules and/or blocks associated with executable and/or resource portions of the EBIF ETV application (e.g., that includes portions associated with .pr and/or .dr filename extensions, respectively). The resource portions of the EBIF ETV application may be based on the EBIF standard, which specifies particular types of content permitted in an application resource, such as a common resource format (e.g., page resource formats, data resource formats, etc.), images (e.g., portable network graphics (PNG) and/or MPEG-2 interframe (MPEG-I)) and/or fonts.

Based on the determination that ETV application is a non-EBIF ETV application, the synchronization application may identify from which source the ETV application is to be obtained. For example, the synchronization application may identify a particular source from which to obtain the ETV application based on location information stored in the AMP data structure (e.g., resource locator field 325 of FIG. 3). In one example, the location information may correspond to the broadcast video stream being received from content delivery system 155. In another example, the location information may correspond to another video stream being received from content delivery system 155. In yet another example, the location information may correspond to another video stream being received from a server device (e.g., application server 175) and/or content provider (e.g., content provider 110). In another example implementation, the location information may include an address (e.g., an IP address, a URL, etc.) from which the non-EBIF ETV application may be downloaded (e.g., from application server 175 using an IP-based protocol, from content provider 110 using an IP-based multicast protocol, and/or some other device and/or protocol).

Video client 160 may monitor the broadcast video stream and/or the other video stream to detect the non-EBIF ETV application based on the application ID. In one example, video client 160 may download, as download indication 410, the non-EBIF ETV application from the broadcast video stream and/or the other video stream (e.g., received from content delivery system 155). In another example, video client 160 may download, as download indication 412 and/or 413 (FIG. 4), the non-EBIF ETV application from application server 175 and/or content provider 110, respectively. The non-EBIF ETV application may, for example, be downloaded from another video stream (e.g., being received from content provider 110 and/or application server 175) in a manner that includes modules and/or blocks associated with executable and/or resource portions of the non-EBIF ETV application (e.g., that includes portions associated with .lua and/or a variety of filename extensions, respectively). In this example, the download may be performed based on Advanced Television Systems Committee's Software Download Data Service standard A/97. In another example, the non-EBIF ETV application may be downloaded (e.g., from content provider 110 and/or application server 175) based on an IP protocol in which the non-EBIF ETV application is downloaded in a manner that does not include modules or blocks.

The resource portions of the non-EBIF ETV application (e.g., associated with the variety of filename extensions) may be based on the EBIF standard and/or a variety of other standards. For example, the resource portions of the non-EBIF standard may include a variety of page resource formats, data resource formats, control signals, image types, video, text, fonts, etc. The executable portion of the non-EBIF ETV application (e.g., associated with the .lua filename extensions) may recognize, read, and/or process the variety of formats included in the resource portions of the non-EBIF ETV application.

As further shown in FIG. 5, process 500 may include detecting an indication to start the ETV application (block 515) and/or processing information associated with the ETV application (block 520). For example, video client 160 may monitor the EISS associated with the broadcast video stream and may detect, as application start indication 415 of FIG. 4, that the ETV application (e.g., the EBIF ETV application and/or the non-EBIF ETV application), downloaded to video client 160, is to be started. The synchronization application may, in response to the indication that the ETV application is to be started, instruct video client 160 to execute the executable portion of the ETV application. In one example, the synchronization application may instruct video client 160 to execute the ETV application immediately upon detecting application start indication 415. This may occur when the synchronization application determines that an event descriptor (e.g., stored in the AMP data structure) matches a time descriptor (e.g., stored in the AMP data structure). In another example, the synchronization application may instruct video client 160 to execute the ETV application at a later point in time (e.g., based on an event descriptor), when the event descriptor does not match the time descriptor. In yet another example, the ETV application may start automatically after the ETV application is downloaded.

Video client 160 may receive an instruction from the synchronization application and may process the ETV application. Processing the ETV application may include decoding the ETV application and/or storing the modules and/or blocks associated with the ETV application in a memory associated with video client 160.

As further shown in FIG. 5, process 500 may include executing the ETV application and presenting ETV pages for display (block 525). For example, video client 160 may cause the executable portion of the EBIF ETV application (e.g., the portion associated with the .pr filename extension) to execute. The executable portion may begin to execute and may read information stored in the resource portion(s) of the EBIF ETV application. The executable portion may use the information read from the resource portions of the EBIF ETV application (e.g., the portion associated with the .dr filename extension) to generate information associated with an ETV page that conforms to the EBIF standard. Video client 160 may present, as an ETV page indication 420 (FIG. 4), the information associated with an ETV page to video display device 165 for display.

In another example, video client 160 may cause the executable portion of the non-EBIF ETV application (e.g., the portion associated with the .lua filename extension) to execute. The executable portion may begin to execute and may read information stored in the resource portion(s) of the non-EBIF ETV application. In one example, the non-EBIF ETV executable portion (e.g., with a .lua filename extension) may run a script (e.g., a Lua script) that identifies from which resource files data is to be read, which types of data are to be read, what page formats are to be configured, etc. The executable portion may use the information, read from the resource portions of the non-EBIF ETV application, to generate information associated with an ETV page that may not conform to the EBIF standard. An ETV page that is generated by the non-EBIF ETV application may, for example, resemble a high-end web page that permits a user (e.g., a user of video client 160) to interact with the ETV page in a manner similar to that which the user interacts with a web page. More particularly, the ETV pages generated by the non-EBIF ETV application may include dynamic 3D animation, images, objects, formats, fonts, and/or other characteristics that are not included and/or are not permitted in an ETV page that conform to the EBIF standard. Video client 160 may present, as ETV page indication 420, the information associated with the ETV page to video display device 165 for display.

In another example implementation, an ETV page that is generated by a non-EBIF ETV application may be customized and/or personalized to preferences and/or habits of a user of video client 160. For example, customization information, which includes preferences identified by a user and/or user habits collected by video client 160) may be transmitted (e.g., at a prior point in time) to application server 175 and/or stored in a memory associated with video client 160. Application server 175 and/or video client 160 may use the customization information (e.g., formats, color preferences, television content genre preferences, desire advertising, etc.) to customize non-EBIF ETV applications and/or data resources in a manner that conforms to the habits and/or preferences of the user.

As yet further shown in FIG. 5, process 500 may include detecting an indication that an ETV application update is present (block 530) and downloading information associated with updating an ETV application based on the indication (block 535). Video client 160 may monitor the EISS associated with the broadcast video stream and may detect, as an update present indication 425 (FIG. 4), that information associated with updating an ETV application (hereinafter referred to as "update information"), is available to be downloaded. Video client 160 may detect that the update information is available to be downloaded based on an application control code stored within the AMP data structure (e.g., application control code 320 of FIG. 3).

Alternatively, or additionally, the synchronization application may determine whether to download the update information based on an application version descriptor obtained from the detection that the update information is available to be downloaded. In one example, the synchronization application may determine that the update information is to be downloaded when the application version descriptor is different (e.g., a later version) than an application version descriptor associated with the ETV application that was downloaded and/or updated at a prior point in time. In another example, the synchronization application may determine that the update information is not to be downloaded when the application version descriptor matches (or corresponds to an earlier version) than an application version descriptor associated with the ETV application that was downloaded and/or updated at the prior point in time.

Based on a determination that the update information is to be downloaded, the synchronization application may determine whether the update information corresponds to an EBIF ETV application or a non-EBIF ETV application based on an application type indicator stored in the AMP data structure (e.g., application type field 310 associated with AMP data structure 300 of FIG. 3). When the application type indicator corresponds to an EBIF ETV application, video client 160 may monitor the broadcast video stream (e.g., being received from content delivery system 155) to identify the update information based on an application ID stored in AMP data structure. Video client 160 may download, as a download update indication 430 (FIG. 4), modules and/or blocks associated with the update information (e.g., that includes updates to the resource portions of the EBIF ETV application). The update information may include EBIF ETV application resources based on the EBIF standard, which specify particular types of content permitted in an application resource as described above (e.g., with respect to block 510).

In another example, when the application type indicator corresponds to a non-EBIF ETV application, the synchronization application may, in a manner similar to that described above (e.g., with respect to block 510), identify from which source to download the non-EBIF ETV update. In one example, the location information may correspond to the broadcast video stream being received from content delivery system 155. In another example, the location information may correspond to another video stream being received from content delivery system 155. In yet another example, the location information may correspond to another video stream being received from a server device (e.g., application server 175). In still another example, the location information may identify an address (e.g., an IP address, a URL, a multicast address, etc.) from which video client 160 may download the non-EBIF update (e.g., using an IP-based protocol).

Video client 160 may monitor the broadcast video stream and/or the other video stream to detect the non-EBIF ETV update based on the application ID. In one example, video client 160 may download, as download update indication 430, the non-EBIF ETV update from the broadcast video stream and/or the other video stream (e.g., received from content delivery system 155). In another example, video client 160 may download, as download update indication 432 and/or 433 (FIG. 4), the non-EBIF ETV update from the other video stream (e.g., received from application server 175 and/or content server 110, respectively). In yet another example, the non-EBIF update may be downloaded (e.g., from content provider 110 and/or application server 175) based on an IP protocol. The non-EBIF ETV update may include application resources associated with a variety file types (e.g., with a corresponding variety of filename extensions) that may be based on the EBIF standard and/or a variety of another standards as described above (e.g., with respect to block 510).

As still further shown in FIG. 5, process 500 may include presenting information associated with an updated ETV application for display (block 540). For example, the executable portion of the EBIF ETV application may read the EBIF ETV update resources and may generate a new page, a different page, and/or an updated page that conform to the EBIF standard. In another example, the executable portion of the non-EBIF ETV application may read the non-EBIF ETV update resources and may generate a new page, a different page, and/or an updated page that may not conform to the EBIF standard. Video client 160 may present, as updated ETV page indication 435 (FIG. 4), the new page, the different page, and/or the updated page for display on video display device 165.

An implementation described herein may include systems and/or methods that enable an ETV application, which does not conform to the EBIF standard (e.g., a non-EBIF ETV application), to be provisioned to a video client device using a conventional messaging protocol, such as an ETV application messaging protocol. The systems and/or methods may use a synchronizing and/or signaling mechanism, based on the ETV application messaging protocol, the enables a video client device to detect, download, decode, execute, update, and/or terminate a non-EBIF ETV application. The systems and or methods may permit the video client device to execute the non-EBIF ETV application in order to generate and/or display one or more ETV pages that do not conform to the EBIF standard. The ETV pages that do not conform to the EBIF standard may permit a user, of the video client device, to view and/or interact with the ETV pages in a manner similar to that which the user interacts with web pages.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIG. 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   detecting, by a video client device and from a first data stream associated with a second data stream, an indication that an Enhanced Television (ETV) application is to be downloaded;
   determining, by the video client device, whether the ETV application conforms to a standard based on a descriptor obtained from the indication;
   downloading, by the video client device and from the second data stream or a third data stream, the ETV application when the descriptor indicates that the ETV application does not conform to the standard, where the second data stream or the third data stream are identified by another descriptor obtained from the indication;
   executing, by the video client device, the ETV application that does not conform to the standard, where the execution causes an executable portion to read information from a resource portion in order to generate an ETV page, where at least one of the resource portion, the ETV page, or the information do not conform to the standard, wherein the standard comprises an ETV Binary Interchange Format (EBIF), standard; and
   presenting, by the video client device and to a video display device, the ETV page for display.

2. The method of claim 1, further comprising:
   downloading, from the second data stream, the ETV application when the descriptor indicates that the ETV application conforms to the standard;
   executing the ETV application that conforms to the standard, where the execution causes another executable portion to read other information from another resource portion in order to generate a conforming ETV page, and where the other resource portion, the conforming ETV page, and the other information conform to the standard; and
   presenting, to the video display device, the conforming ETV page for display.

3. The method of claim 2, where the ETV application that conforms to the standard is generated using a tool that is based on the standard; and
   where the ETV application that does not conform to the standard is generated using another tool that is not based on the standard.

4. The method of claim 1, where the standard further comprises a non-EBIF ETV standard.

5. The method of claim 1, where before downloading the ETV application when the descriptor indicates that the ETV application does not conform to the standard, the method further includes:

detecting, from the first data stream, another indication that an update to the ETV application is to be downloaded based on a version descriptor obtained from the other indication, downloading, from the second data stream or the third data stream and in response to the other indication, the update to the ETV application based on a determination that the update to the ETV application corresponds to the ETV application that does not conform to the standard;

executing the update to the ETV application, where the executing includes updating or replacing the ETV page to create another ETV page, where the other ETV page does not conform to the standard; and presenting, to a video display device, the other ETV page for display.

6. The method of claim 1, where presenting the ETV page for display includes:

synchronizing the presenting of the ETV page and the second data stream based on a time descriptor and an event descriptor, where the ETV page is presented at a point in time when the event descriptor matches the time descriptor.

7. The method of claim 1, where executing the ETV application that does not conform to the standard includes:

retrieving data from files associated with the resource portion, where a type of the data or a type of the file are defined by a script associated with the executable portion and are not defined by the standard; and generating the ETV page using the retrieved data.

8. The method of claim 1, where the executable portion is based on a scripting language, the method further comprising:

generating, by the executable portion, another ETV page that is based on a data type or a file type that does not conform to the standard.

9. The method of claim 1, further comprising:

downloading another ETV application that does not conform to the standard, where the downloading is performed using an Advanced Television Systems Committee Software Download Data Service Standard A/97; and executing the other ETV application using a scripting language, embedded within a broadcast video stream, that permits the ETV application to be executed in a manner that is not based on an ETV Binary Interchange Format (EBIF).

10. A video client device comprising:

a processor to:

detect a first indication that an ETV application is available to be downloaded from a broadcast video stream, determine whether the ETV application conforms to an ETV Binary Interchange Format (EBIF) standard based on the first indication;

download, in response to the first indication, the ETV application from the broadcast video stream, when the first indication relating to the ETV application does not conform to the ETV EBIF standard, and where the ETV application includes:

a partition file, based on a scripting language, that does not conform to an ETV EBIF standard, and a plurality of resource files, based on one or more file types, that include a plurality of data types, where at least one of the one or more file types or at least one of the plurality of data types do not conform to the EBIF standard, detect a second indication that the ETV application is to be started, execute the partition file, in response to the second indication, where the executing causes the partition file to read the plurality of data types from the plurality of resource files and to generate an ETV page using the plurality of data types, and present, to a video display device, the ETV page, where the ETV page includes information that does not conform to the EBIF standard.

11. The video client device of claim 10, where the detecting and the downloading are performed based on a conventional ETV signaling or synchronization protocol.

12. The video client device of claim 10, where, before downloading the ETV application, the processor is to:

identify that the ETV application does not conform to the EBIF standard based on an application type indicator in the first indication, and process the ETV application, using an algorithm that executes applications that do not conform to the EBIF standard, based on the identification that the ETV application does not conform to the EBIF standard.

13. The video client device of claim 10, where the processor is further to:

download another ETV application that conforms to the EBIF standard, and process the ETV application based on the EBIF standard.

14. The video client device of claim 10, where, when detecting the first indication that the ETV application is available to be downloaded, the processor is further to:

monitor an ETV integrated signaling stream (EISS) that includes one or more indications associated with the broadcast video stream, where one of the one or more indications is the first indication and another one of the one or more indications is the second indication.

15. The video client device of claim 10, where, when detecting the first indication that the ETV application is available to be downloaded, the processor is further to:

determine from which of a plurality of broadcast video streams to download the ETV application based on a resource locator obtained from the first indicator, and identify the broadcast video stream, of the plurality of broadcast video streams, when the resource locator corresponds to the broadcast video stream.

16. The video client device of claim 10, where the scripting language is used in gaming applications or three-dimensional animation applications and is embedded into the broadcast video stream.

17. A method comprising:

detecting, by a set top box and from an Enhanced Television (ETV) integrated signaling stream (EISS), a first indication that an ETV application is available to be downloaded;

downloading, by the set top box and in response to the first indication, the ETV application from a video stream identified by the first indication, where the ETV application does not conform to an ETV Binary Interchange Format (EBIF) standard;

detecting, by the set top box and from the EISS, a second indication that the ETV application is to be started;

executing, by the set top box and in response to the second indication, the ETV application to generate one or more ETV pages, where the one or more ETV pages include information that is not permitted by the EBIF standard; and displaying, by the set top box, the one or more ETV pages on a video display device, associated with the set top box, that enables a user, of the set top box, to interact with the one or more ETV pages.

18. The method of claim 17, where executing the ETV application further includes:

executing a first portion of the ETV application to cause the first portion to read data from one or more second portions of the ETV application, where the first portion or the second portion do not conform to the EBIF standard; and generating, using the data, the one or more ETV pages based on a page format, a font, or data format that is not permitted by the EBIF standard.

19. The method of claim 18, where the first portion is based on a script language that is embedded in the video stream, and where the second portion includes a file type specified by the first portion.

20. The method of claim 17, further comprising detecting a third indication that an update to the ETV application is available to be downloaded, downloading, in response to the third indication, the update to the ETV application, where the update to the ETV application does not conform with the EBIF standard; and updating the one or more ETV pages based on the downloaded update to the ETV application.

21. The method of claim 17, where downloading the ETV application further includes:

monitoring the video stream to identify one or more modules associated with the ETV application:

identifying at least one module, of the one or more modules, when an application identifier obtained from the first indication matches another application identifier associated with the at least one module; and initiating a download of the one or more modules based on identifying the at least one module.

22. The method of claim 21, where initiating the download of the one or more modules is based on an Advanced Television Systems Committee Software Download Data Service Standard A/97.

23. The method of claim 17, where detecting, from the EISS, the first indication or the second indication are based on an ETV application messaging protocol.

24. The method of claim 17, further comprising:

detecting, from the EISS, a third indication that an ETV application is available to be downloaded, where the third indication includes an address associated with a server device from which another ETV application, that does not conform the EBIF standard, is to be downloaded;

downloading, from the server device and in response to the third indication, the other ETV application based on an Internet Protocol (IP)-based protocol; and executing the other ETV application based on control signaling obtained from the EISS.

25. The method of claim 17, further comprising:

detecting, from the EISS, a third indication that an ETV application is available to be downloaded, where the third indication includes an address associated with a content provider from which another ETV application, that does not conform to the EBIF standard, is to be downloaded;

downloading, from the content provider and in response to the third indication, the other ETV application based on an Internet Protocol (IP)-based multicast protocol data stream;

retrieving, from a memory associated with the set top box, customization information associated with a user of the set top box, where the customization information includes preferences specified by the user and viewing habits associated with the user;

executing the other ETV application to generate one or more personalized ETV pages based on control signaling obtained from the EISS and the customization information; and displaying, by the set top box, the one or more personalized ETV pages on the video display device that enables the user to interact with the one or more personalized ETV pages.

\* \* \* \* \*